UNITED STATES PATENT OFFICE.

JOHANNES JANSEN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

GREEN AZO DYE.

961,354. Specification of Letters Patent. Patented June 14, 1910.

No Drawing. Application filed February 26, 1910. Serial No. 546,041.

*To all whom it may concern:*

Be it known that we, JOHANNES JANSEN and WILHELM NEELMEIER, doctors of philosophy, chemists, citizens of the German Empire, residing at Leverkusen, near Cologne, Germany, have invented new and useful Improvements in Green Azo Dyes, of which the following is a specification.

The present invention relates to the manufacture and production of a new dyestuff of great technical value. It is obtained by combining the diazo compound of 6-chloro-4-nitro-2-aminophenol with 1.8-diaminonaphthalene-4-sulfonic acid and treating the thus obtained diaminoazo compound with nitrous acid. The resulting dyestuff contains an azimido group. When dyed direct it yields violet shades, which when subsequently treated with bichromates change into pure yellowish-green shades. The same dyestuff can be obtained by combining the diazotized 6-chloro-4-nitro-2-aminophenol with 1.8-aziminonaphthalene-4-sulfonic acid.

In order to carry out the new process more fully the following example is given, the parts being by weight:—18.8 parts of 6-chloro-4-nitro-2-aminophenol, made into a fine paste with water and 140 parts of hydrochloric acid (19° Bé.) are diazotized with 7 parts of sodium nitrite. The diazo compound thus obtained is then added to a neutral solution of the sodium salt of 24.8 parts of 1.8-naphthalene-diamin-4-sulfonic acid to which 35 parts of sodium acetate have been added. The combination is complete after 65–70 hours. The dyestuff separates during this time. It is filtered off, dissolved in a sodium carbonate solution and to this solution after having been cooled to 0° C. 50 parts of hydrochloric acid and 7 parts of sodium nitrite are added. The azimid dye separates. After two hours the mixture is rendered alkaline with sodium carbonate and heated to 50° C. The new dye is then precipitated with common salt. It is, after being dried and pulverized, a black powder soluble in water with a violet color, soluble in concentrated sulfuric acid with a bluish-green color and yielding by reduction with stannous chlorid and hydrochloric acid 2.4-diamino-6-chlorophenol and 2-amino-1.8-aziminonaphthalene-4-sulfonic acid. The same dye results by combining the diazo compound obtained from 18.8 parts of 6-chloro-4-nitro-2-aminophenol with a solution of 25 parts of 1.8-aziminonaphthalene-4-sulfonic acid containing an excess of sodium carbonate.

We claim:

The herein-described new dyestuff, obtainable by combining the diazo compound of 6-chloro-4-nitro-2-aminophenol with 1.8-diaminonaphthalene-4-sulfonic acid and treating the diaminoazo compound thus obtained with nitrous acid which new dye is, after being dried and pulverized, in the shape of its sodium salt a black powder soluble in water with a violet color, soluble in concentrated sulfuric acid with a bluish-green color, yielding by treatment with stannous chlorid and hydrochloric acid 2.4-diamino-6-chlorophenol and 2-amino-1.8-aziminonaphthalene-4-sulfonic acid; and dyeing wool violet shades changing into pure yellowish-green shades when subsequently treated with bichromate, substantially as described.

In testimony whereof we have hereunto set our hands in the presence of two subscribing witnesses.

JOHANNES JANSEN. [L. S.]
WILHELM NEELMEIER. [L. S.]

Witnesses:
 OTTO KÖNIG,
 CHAS. J. WRIGHT.